June 15, 1954  D. F. HYLAND  2,680,923
FISHING ROD
Filed Jan. 3, 1949
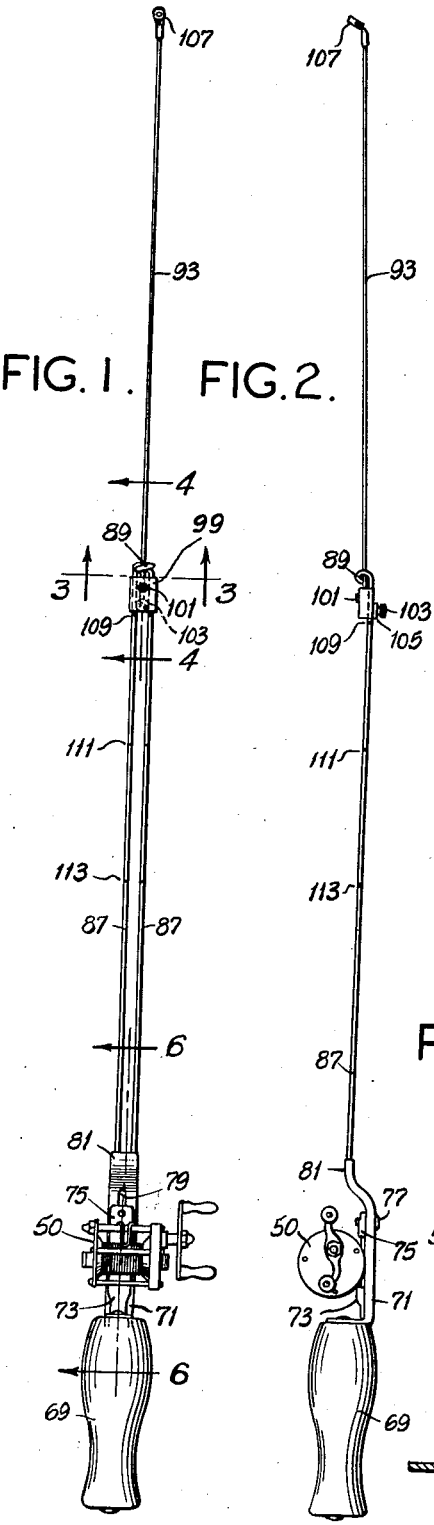
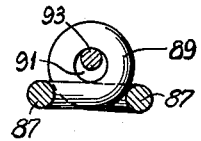
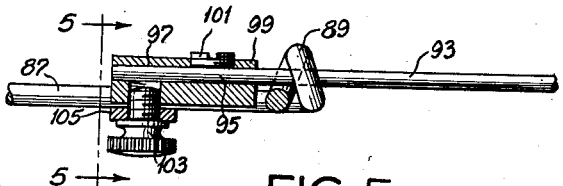
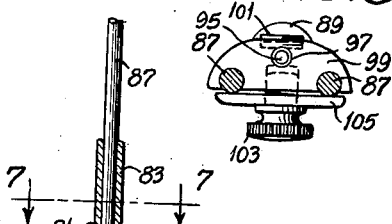
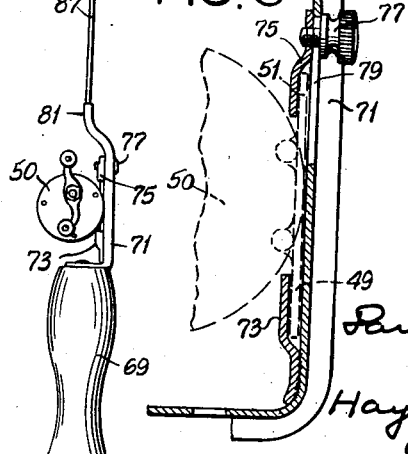
Daniel F. Hyland,
Inventor.
Haynes and Koenig
Attorneys.

Patented June 15, 1954

2,680,923

UNITED STATES PATENT OFFICE 2,680,923

FISHING ROD

Daniel F. Hyland, St. Louis, Mo.

Application January 3, 1949, Serial No. 68,769

1 Claim. (Cl. 43—18)

This invention relates to fishing rods, and with regard to certain more specific features, to extensible fishing rods including reels.

Among the several objects of the invention may be noted the provision of an inexpensive extensible fishing rod which is readily adaptable to trolling, casting and bank line fishing; and the provision of a rod of the class described which is readily adaptable for efficiently casting various weights of bait. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which one of various possible embodiments of the invention is illustrated, Fig. 1 is a plan view of a rod of this invention;

Fig. 2 is a right-side elevation of Fig. 1;

Fig. 3 is an enlarged cross section taken on line 3—3 of Fig. 1;

Fig. 4 is an enlarged longitudinal section taken on line 4—4 of Fig. 1;

Fig. 5 is a cross section taken on line 5—5 of Fig. 4;

Fig. 6 is an enlarged fragmentary longitudinal section taken on line 6—6 of Fig. 1, a reel being shown by dash lines; and, Fig. 7 is a cross section taken on line 7—7 of Fig. 6, but turned through 90°.

Similar reference characters indicate corresponding parts throughout the several views of the drawings.

Referring to the drawings, numeral 69 shows a handle to which is fastened a reel seat 71, shown in detail in Fig. 6. This comprises a plate having a welded tongue 73 for the reception of the tongue 49 of a reel 59. The other tongue 51 of the reel 59 is held by means of a clip 75 to which is threaded a thumbscrew 77, the latter passing through a slot 79 in the reel seat 71. The reel seat 71 includes an offset extension 81, the sides of which are crimped as shown at 83 to the rearward ends 85 of a pair of spaced parallel semi-rigid rods 87 which at their forward ends are joined by an integral loop 89 (Fig. 3) forming a guide member having a longitudinal opening 91 located generally between the rods for the sliding reception of a flexible rod tip 93. This tip consists of a length of spring metal of a diameter suitable for the fishing to be practiced. It is in general smaller in diameter than the rods 87. The rearward end 95 of the rod tip 93 enters an opening 97 in a slide member 99 straddling the rods 87, being held in place by means of a set screw 101. The slider 99 is adapted to receive a thumbscrew 103 for adjusting a holding clamp 105, also straddling the rods 87. This is in effect a positioning clutch. The outer end of the rod tip 93 is provided with the usual guide eye 107 for the fishing line.

In view of the above, it will be seen that the slide member 99 may be retracted to a position wherein the flexible rod tip 93 is substantially completely retracted and the guide eye 107 is closely adjacent the guide member 89 to provide a relatively short stiff fishing rod, or extended to a forward position determined by its engagement with member 89 wherein the tip is fully extended to provide a relatively long flexible fishing rod. Interchange may be made between tips 93 of various diameters so as to obtain various whipping effects in casting. Moreover, with a given tip, adjustments may be made of the slider 99 for various extensions. Such various extensions also control the character of the whip obtained. If desired, calibrations 109, 111, 113 may be marked on the wire 87 to indicate proportionate bait weights. For example, calibrations 109, 111 and 113 may indicate bait weights of ¼ ounce, ⅜ ounce and ½ ounce, respectively.

From the above, the advantage of the invention will be seen to comprise a relatively stiff inner section composed of a pair of semi-rigid slide rods and a relatively flexible outer section composed of a single flexible rod tip guided through an opening formed at the juncture between the slide rods and fastened at its inner end to an adjustable slider. Thus the length and flexibility of the rod may be readily controlled for adapting it to various types of fishing such as casting, trolling, bank fishing, surf fishing, etc. The adjustable wire extension is interchangeable with others having different diameters. The construction is strong but light and very economical to manufacture.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

A fishing rod comprising a reel seat, said seat comprising a plate having an offset extension at its forward end, a handle secured to the rearward end of the reel seat, a rod section extending forward from the reel seat comprising a pair of spaced parallel semi-rigid rods joined at their forward end by a guide member having a longitudinal opening located generally between the rods, said extension having sides crimped around the rearward ends of said semi-rigid rods, a slide member straddling the rods and longitudinally slidable thereon to different positions of longitudinal adjustment, and a flexible rod tip fixed at one end to the slide member and extending forward therefrom through the opening in the guide member and having a guide eye at its forward end for guiding a fishing line, said slide member having a retracted position wherein the flexible rod tip is substantially completely retracted and the guide eye is closely adjacent the guide member to provide a relatively short stiff fishing rod, and said slide member having a forward position determined by its engagement with the guide member wherein the flexible rod tip is fully extended to provide a relatively long flexible fishing rod.

References Cited in the file of this patent

UNITED STATES PATENTS

| Number | Name | Date |
|---|---|---|
| D. 106,854 | Tichenor | Nov. 2, 1937 |
| 359,153 | Horton | Mar. 8, 1887 |
| 828,557 | Levison | Aug. 14, 1906 |
| 1,001,326 | Upton | Aug. 22, 1911 |
| 1,843,714 | Fuller | Feb. 2, 1932 |
| 1,914,500 | Groschup | June 20, 1933 |
| 1,981,082 | Smith | Nov. 20, 1934 |
| 2,099,628 | Sampson | Nov. 16, 1937 |
| 2,240,488 | Benson | May 6, 1941 |
| 2,276,524 | Taylor | Mar. 17, 1942 |